(12) United States Patent
Lu et al.

(10) Patent No.: US 10,773,247 B2
(45) Date of Patent: Sep. 15, 2020

(54) HOLLOW POROUS CARBON NITRIDE NANOSPHERES COMPOSITE LOADED WITH AGBR NANOPARTICLES, PREPARATION METHOD THEREOF, AND ITS APPLICATION IN DYE DEGRADATION

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 182 days.

(21) Appl. No.: 16/170,107

(22) Filed: Oct. 25, 2018

(65) Prior Publication Data
US 2019/0126257 A1 May 2, 2019

(30) Foreign Application Priority Data
Oct. 26, 2017 (CN) .......................... 2017 1 1015117

(51) Int. Cl.
*B01J 27/24* (2006.01)
*B01J 35/00* (2006.01)
(Continued)

(52) U.S. Cl.
CPC .............. *B01J 27/24* (2013.01); *B01J 27/08* (2013.01); *B01J 27/13* (2013.01); *B01J 35/002* (2013.01);
(Continued)

(58) Field of Classification Search
CPC .... B01J 31/069; B01J 35/004; B01J 35/0006; B01J 35/06; B01J 35/08; B01J 19/127;
(Continued)

(56) References Cited

PUBLICATIONS

Li, Xuewen, et al. "AgBr-loaded hollow porous carbon nitride with ultrahigh activity as visible light photocatalysts for water remediation." Applied Catalysis B: Environmental 229 (2018): 155-162.*

(Continued)

*Primary Examiner* — Richard M Rump
(74) *Attorney, Agent, or Firm* — SZDC Law P.C.

(57) ABSTRACT

A hollow porous carbon nitride nanospheres composite loaded with AgBr nanoparticles, preparation method thereof, and its application in dye degradation are disclosed. Using silica nanosphere with core-shell structure as a template and hydrogen cyanamide as precursor, melting to enter the pores of mesoporous silica, after calcination, the silica template is etched with ammonium bifluoride to obtain hollow porous carbon nitride nanospheres; dispersing hollow porous carbon nitride nanospheres in deionized water, adding silver nitrate and sodium bromide in sequence, and obtaining silver bromide nanoparticles by in-situ ion exchange method, stirring, washing and centrifuging to obtain the hollow porous carbon nitride nanospheres composite. The hollow porous carbon nitride prepared by the template method has good photocatalytic effect on dye degradation after composite with silver bromide; and it has the advantages of easy production of raw materials, good stability, reusability, etc. It has application prospects in the treatment of dyes.

3 Claims, 4 Drawing Sheets

(51) Int. Cl.
| | |
|---|---|
| B01J 35/08 | (2006.01) |
| B01J 37/00 | (2006.01) |
| B01J 37/08 | (2006.01) |
| B01J 37/02 | (2006.01) |
| B01J 37/06 | (2006.01) |
| C02F 1/32 | (2006.01) |
| C02F 1/72 | (2006.01) |
| B01J 27/08 | (2006.01) |
| B01J 27/13 | (2006.01) |
| C01B 21/06 | (2006.01) |
| C02F 101/30 | (2006.01) |
| C02F 101/34 | (2006.01) |
| C02F 101/38 | (2006.01) |

(52) U.S. Cl.
CPC ............ *B01J 35/004* (2013.01); *B01J 35/008* (2013.01); *B01J 35/0013* (2013.01); *B01J 35/0033* (2013.01); *B01J 35/08* (2013.01); *B01J 37/0072* (2013.01); *B01J 37/0201* (2013.01); *B01J 37/06* (2013.01); *B01J 37/08* (2013.01); *C01B 21/0605* (2013.01); *C02F 1/32* (2013.01); *C02F 1/725* (2013.01); *C02F 2101/308* (2013.01); *C02F 2101/34* (2013.01); *C02F 2101/38* (2013.01); *C02F 2101/40* (2013.01); *C02F 2305/08* (2013.01); *C02F 2305/10* (2013.01)

(58) Field of Classification Search
CPC ........ B01J 21/18; B01J 27/24; B01J 37/0018; B01J 37/0072; B01J 37/0221; B01J 37/04; B01J 37/084; B01J 2231/002; B01J 2231/005; B01J 2231/008; B01D 2255/70; B01D 2255/702; B01D 2255/802; B01D 2257/404; B01D 2259/802; C01B 21/06; C01B 21/0605
See application file for complete search history.

(56) References Cited

PUBLICATIONS

Wu, Hongxin, et al. "Hollow porous carbon nitride immobilized on carbonized nanofibers for highly efficient visible light photocatalytic removal of NO" Nanoscale 8.23 (2016): 12066-12072.*

H. Y. Li, S. Y. Gan, H. Y. Wang, D. X. Han and L. Niu, Adv. Mater., 2015, 27, 6906.*

Sun, Jianhua, et al. "Bioinspired hollow semiconductor nanospheres as photosynthetic nanoparticles." Nature Communications 3.1 (2012): 1-7.*

Yang, Siyuan, et al. "Mesoporous polymeric semiconductor materials of graphitic-C 3 N 4: general and efficient synthesis and their integration with synergistic AgBr NPs for enhanced photocatalytic performances." RSC advances 3.16 (2013): 5631-5638.*

* cited by examiner

HOLLOW POROUS CARBON NITRIDE NANOSPHERES COMPOSITE LOADED WITH AGBR NANOPARTICLES, PREPARATION METHOD THEREOF, AND ITS APPLICATION IN DYE DEGRADATION

This application claims priority to Chinese Patent Application No.: 201711015117.7, filed Oct. 26, 2017, which is incorporated by reference for all purposes as if fully set forth herein.

FIELD OF THE INVENTION

The present invention relates to the field of nanocomposite materials, it is specifically involved the composite of AgBr nanoparticles loaded on the hollow porous carbon nitride nanospheres and its preparation method and application in dye degradation.

TECHNICAL BACKGROUND

With the rapid development of technology and rapid industrialization in recent years, the discharge of untreated industrial wastewater has seriously exceeded the standard, which has damaged the ecological environment and endangered human health. Organic synthetic dyes are widely used in the textile and printing industries. Dyes are generally biotoxic and carcinogenic, and are difficult to completely degrade by microorganisms in the environment. Among them, azo dyes are the most difficult to remove, because their highly substituted aromatic ring structure is extremely stable. Therefore, it is extremely urgent to find efficient, fast and low-cost treatment of azo dyes.

Since Honda et al. used $TiO_2$ electrode to photohydrogenate to produce hydrogen in 1972, research on materials based on semiconductor photocatalysts has developed rapidly. A large number of semiconductor photocatalysts, such as zinc oxide, antimony phosphate, antimony oxide, antimony carbonate, and ferric oxide, have been studied to degrade dyes, but the degradation time is generally long, about 2 h, due to the rapid electron-hole pairing recombination and low utilization of visible light.

SUMMARY OF THE INVENTION

The purpose of this invention is to provide a hollow porous carbon nitride nanospheres composite loaded with AgBr nanoparticles and its preparation method. The AgBr nanoparticles are loaded onto the surface of the hollow porous carbon nitride spheres by the deposition-precipitation method, to achieve the purpose of treating the organic dyes in the wastewater.

In order to achieve the above purposes, the invention adopts the following specific technical scheme:

A preparation method of hollow porous carbon nitride nanospheres composite loaded with AgBr nanoparticles, comprising the following steps:

(1) using silica nanosphere with core-shell structure as a template and hydrogen cyanamide as precursor to prepare hollow porous carbon nitride nanospheres after reaction, calcination and template removal;

(2) dispersing said hollow porous carbon nitride nanospheres in deionized water, adding silver nitrate and sodium bromide in sequence, to obtain hollow porous carbon nitride nanospheres composite loaded with AgBr nanoparticles.

The present invention also disclosed a kind of hollow porous carbon nitride nanospheres and preparation method thereof, comprising the following steps: using silica nanosphere with core-shell structure as a template and hydrogen cyanamide as precursor to prepare hollow porous carbon nitride nanospheres.

The preparation method of the present invention can be described as follows:

(1) Using silica nanosphere with core-shell structure as a template and hydrogen cyanamide as precursor, reacting to enter the pores of mesoporous silica, after calcination, the silica template is etched with ammonium bifluoride to obtain hollow porous carbon nitride nanospheres;

(2) dispersing hollow porous carbon nitride nanospheres in deionized water, adding silver nitrate and sodium bromide in sequence, stirring, and obtaining silver bromide nanoparticles by in-situ ion exchange method, then washing, centrifuging, drying to obtain hollow porous carbon nitride nanospheres composite loaded with AgBr nanoparticles.

In the above technical scheme, in step (1), the mass ratio of silica:cyanamide=1:5; the reaction temperature is 60° C. for 24 hours; the calcination is carried out at 550° C. for 4 h with a heating rate of 5° C./min in argon. Using ammonium hydrogen fluoride to etch the template; the etching time is 12 h.

In the invention, the hollow porous carbon nitride nanospheres are prepared by a hard-templating method, it has a large specific surface area, uniform pore size, and a large specific surface area can promote the catalytic performance, it is a good semiconductor catalyst.

In the above technical scheme, in the step (2), the mass ratio of hollow porous carbon nitride and AgBr is 5:3. And the stirring treatment is carried out in the dark for 4 hours. The invention adopts the deposition-precipitation method to directly load the AgBr nanoparticles on the surface of hollow porous carbon nitride sphere, and the formed AgBr nanoparticles are extremely small and uniformly.

The present invention further discloses the application of the above-mentioned hollow porous carbon nitride nanospheres which loaded with AgBr nanoparticles in the treatment of dyes in the wastewater.

Advantages of the Present Invention

1. In the invention, the hollow porous carbon nitride nanospheres has a large specific surface area, uniform pore size, good conductivity, a large specific surface area can promote the catalytic performance, it is a good semiconductor catalyst.

2. In the invention, graphitic carbon nitride (g-$C_3N_4$), a metal-free, conjugated, polymeric semiconductor, and it has high physicochemical stability, favorable electronic band structure and facile synthesis by thermal polymerization of abundant nitrogen-rich precursors. However, owing to a high recombination rate of charge carriers, low electrical conductivity, and low specific surface area (7.7 $m^2$ $g^{-1}$) in bulk $C_3N_4$, native $C_3N_4$ still has limitations in practical applications. This invention regulates the electronic structure and optical properties, enlarges the specific surface area, reduces the recombination rate of the charges, while improves the photocatalytic efficiency.

3. In the invention, the preparation method of the composite which was loaded AgBr nanoparticles on the surface of hollow porous carbon nitride nanospheres are simple. It has uniform pore diameter and large specific surface area. The formed AgBr nanoparticles are small and uniformly loaded on the surface of the hollow porous carbon nitride nanospheres. The obtained product can effectively degradation the dye in the wastewater.

DETAILED DESCRIPTION OF THE INVENTION

Implementation 1
Synthesis of the $SiO_2$ with Core-Shell Structure, Comprising the Following Steps:

10 mL ultrapure water and 3.5 g aqueous ammonia were added into round-bottom flask including 58.5 g ethanol solution. After stirring for 30 min at 30° C., 5.6 mL TEOS was added into the above-prepared mixture quickly and the mixture kept stirring for 1 h to yield uniform silica spheres. To create a mesoporous silica shell, a mixture solution containing 5.83 g TEOS and 2.62 g $C_{18}$ TMOS was added into above solution drop by drop. Then, the mixed solution was kept static for 1 h. The resulting reaction solution was centrifuged, washed, dried, then calcined at 550° C. for 6 h. Washed with a 1-M HCl solution, washed with ethanol and dried at 80° C.

Implementation 2
Synthesis of Hollow Porous Carbon Nitride Nanospheres (HCNS), Comprising the Following Steps:

1 g $SiO_2$ powder and 5 g thawy cyanamide were fully mixed, reacting for 1 h at 60° C. Then treating by ultrasonic treatment for 4 h, reacting at 60° C. for one night. The resultant was centrifuged and dried in air to obtain a white powder that was put into a crucible to calcine under flowing Ar to obtain HCNS, raising the temperature to 550° C. with a heating rate of 4.4° C./min, calcining for 4 h. By calcination, the present invention obtains HCNS having a large specific surface area.

Figure 1:
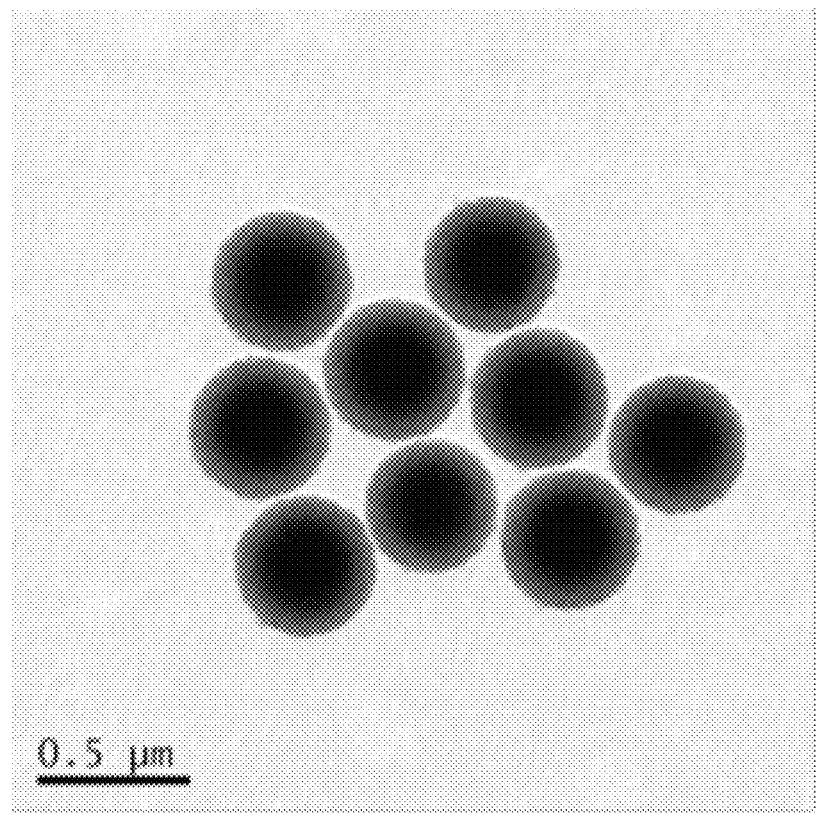
FIG. 1. TEM images of the silica after calcination at 550° C.
Figure 2:
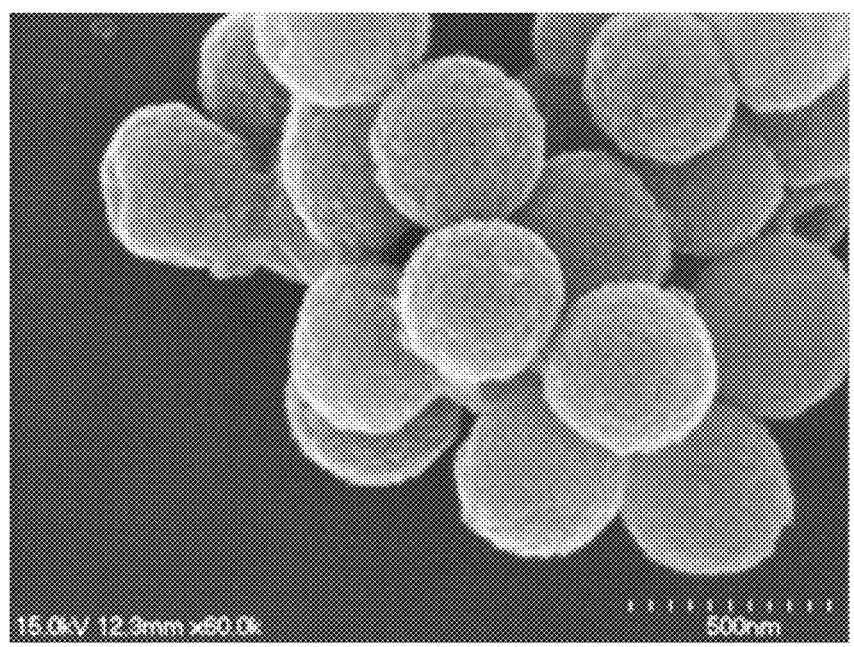
FIG. 2. SEM images of the hollow porous carbon nitride nanospheres after calcination at 550° C.
Figure 3:
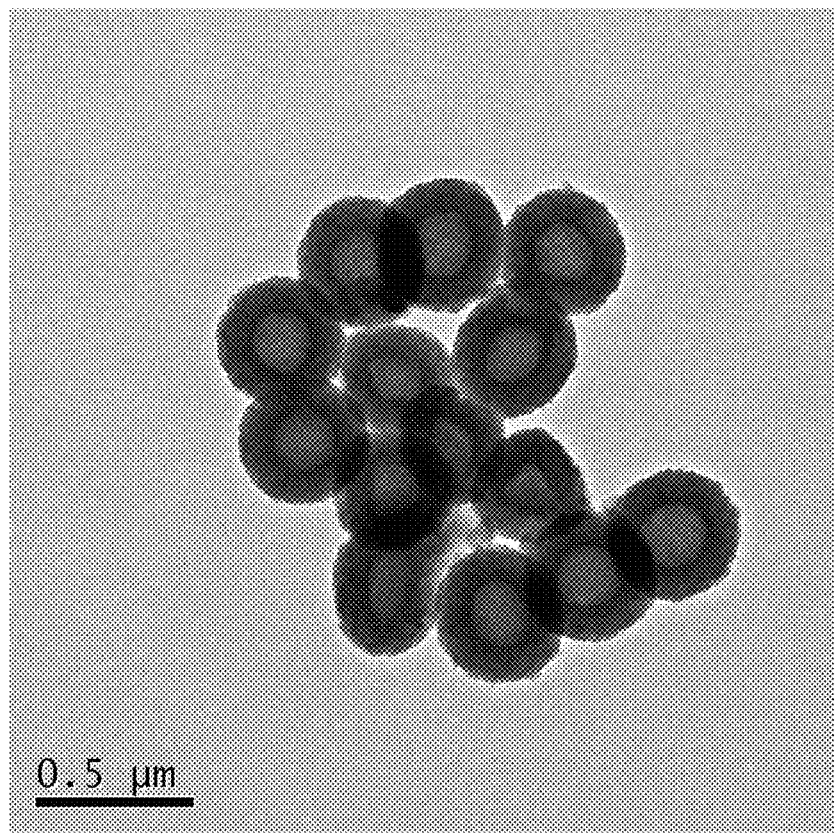
FIG. 3. TEM images of the hollow porous carbon nitride nanospheres after calcination at 550° C.

FIG. 1 showed the TEM images of silica with core-shell structure. FIG. 2 showed the SEM images of hollow porous carbon nitride nanospheres. FIG. 3 showed the TEM images of HCNS, the hollow sphere structure can be seen from the figure, and the distribution is more uniform.

Implementation 3
Loading AgBr Nanoparticles onto the Surface of Hollow Porous Carbon Nitride Nanospheres, Comprising the Following Steps:

A given amount of HCNS (obtained in Implementation 2) was dispersed in 8 mL deionized water, and the suspension was sonicated for 30 min. Then, 85 mg $AgNO_3$ was added into above suspension and stirred for 1 h in the dark. Then, 51.5 mg NaBr was dissolved in 5 mL water and added dropwise into the above mixture, which was stirred for 3 h in the dark. The resulting products were centrifuged and washed and dried at 60° C. for one night, to obtain hollow porous carbon nitride nanospheres loaded with AgBr nanoparticles, noted as HCNS/AgBr. Different mass ratios composite materials were obtain according to the different mass of hollow porous carbon nitride nanospheres added, and noted as HCNS/AgBr10, HCNS/AgBr30, HCNS/AgBr60, HCNS/AgBr90.

Figure 4:
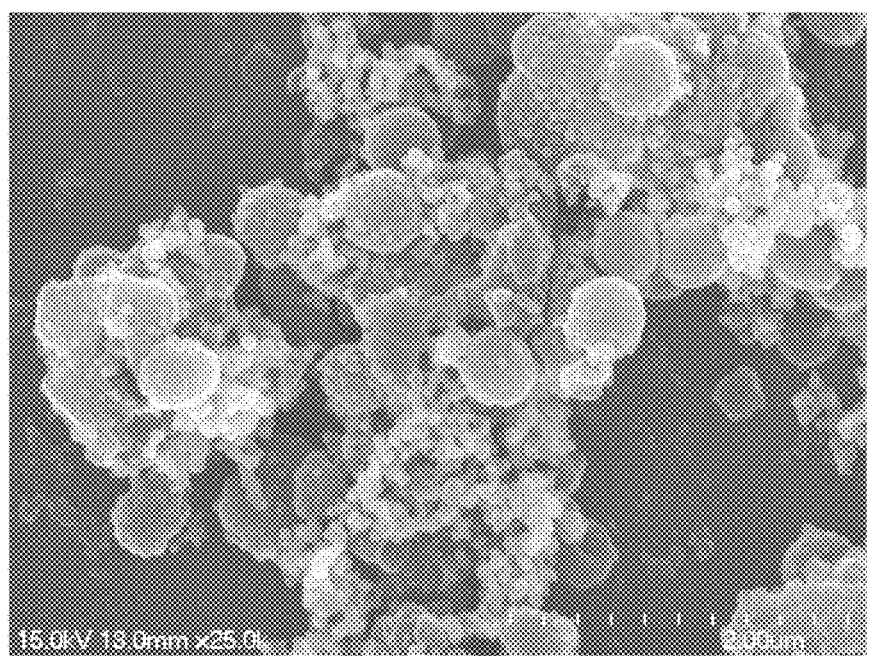
FIG. 4. SEM images of AgBr nanoparticles loaded on the surface of hollow porous carbon nitride nanospheres.
Figure 5:
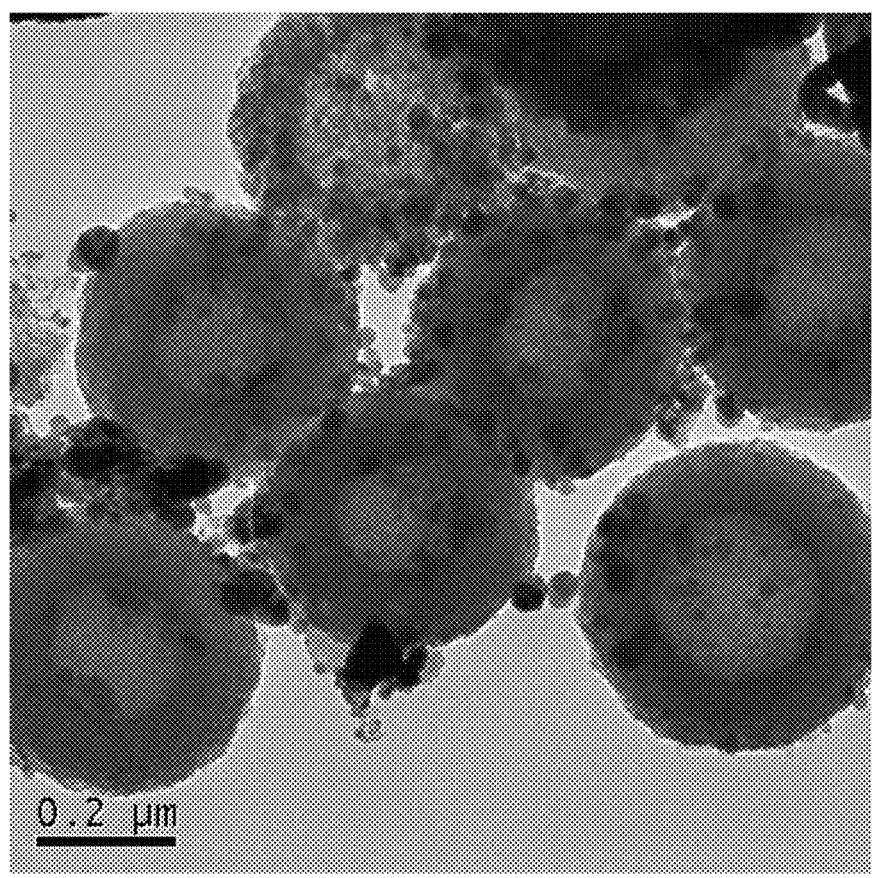
FIG. 5. TEM images of AgBr nanoparticles loaded on the surface of hollow porous carbon nitride nanospheres.

FIG. 4 showed the SEM images of AgBr nanoparticles loaded on the surface of hollow porous carbon nitride nanospheres. FIG. 5 showed the TEM images of AgBr nanoparticles loaded on the surface of hollow porous carbon nitride nanospheres. It can be seen from the figure that the silver bromide has a smaller particle size and a more uniform distribution.

Implementation 4
Photocatalytic Activity, Comprising the Following Steps:

0.1 g photocatalysts, hollow porous carbon nitride nanospheres composite loaded with AgBr nanoparticles, were put into 100 mL OG (25 ppm) in a reactor. Stir for 30 min at in the dark to get adsorption equilibrium. Degradation by 300 W xenon lamp, sampling 3 mL at certain time intervals, obtaining centrifugation solution for UV-vis spectroscopy analysis.

Figure 6:
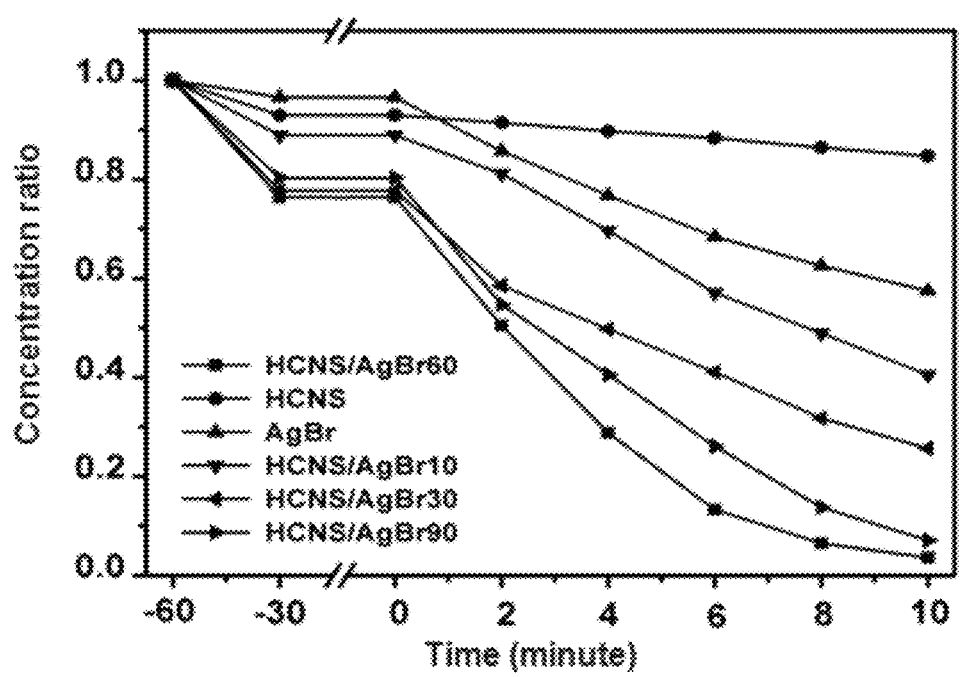
FIG. 6. Catalytic effect diagram of hollow porous carbon nitride nanospheres with different loadings of silver bromide nanoparticles.
Figure 7:
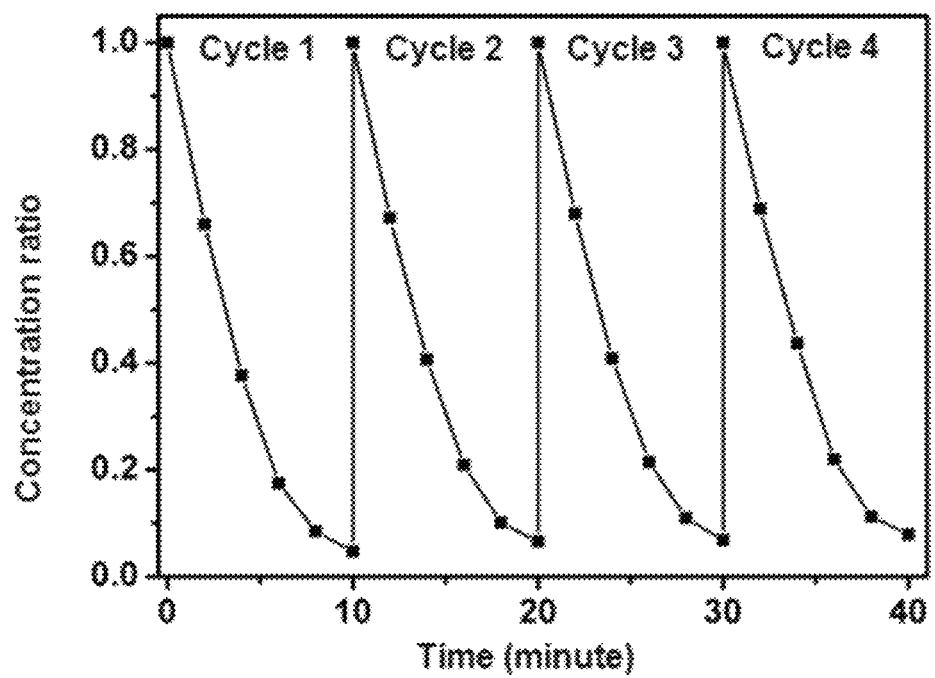
FIG. 7. Catalytic cycle diagram of hollow porous carbon nitride nanospheres loaded with silver bromide nanoparticles.

FIG. 6 shows the effect of degradation of acid orange G with different mass ratios; FIG. 7 shows a cycle diagram of the number of catalyst (HCNS/AgBr60).

What is claimed is:

1. A preparation method of hollow porous carbon nitride nanospheres composite loaded with AgBr nanoparticles, comprising the following steps:
   (1) using silica nanosphere with core-shell structure as a template and hydrogen cyanamide as precursor to prepare hollow porous carbon nitride nanospheres after reaction, calcination and template removal;
   (2) dispersing said hollow porous carbon nitride nanospheres in deionized water, adding silver nitrate and sodium bromide in sequence, to obtain hollow porous carbon nitride nanospheres composite loaded with AgBr nanoparticles,
   wherein in step (2), in the hollow porous carbon nitride nanospheres composite loaded with AgBr nanoparticles, the mass ratio of hollow porous carbon nitride to silver bromide is 5:3; the reaction is carried out in the dark, and the reaction time is 4 hours.

2. The preparation method of hollow porous carbon nitride nanospheres composite loaded with AgBr nanoparticles according to claim 1, wherein in step (1), the mass ratio of silica to hydrogen cyanamide is 1:5; the temperature of the reaction is 60° C., and the time is 24 h; said calcination is carried out under argon protection, and the heating rate is 5° C./min during calcining, the calcination time is 4 h, the calcination temperature is 550° C.; the template is etched using ammonium bifluoride; the etching time is 12 h.

3. The preparation method of hollow porous carbon nitride nanospheres composite loaded with AgBr nanoparticles according to claim 1, wherein in step (1), mixing water, ammonia water, ethanol, then adding tetraethyl orthosilicate, stirring to obtain a silica core solution; adding a mixture of tetraethyl orthosilicate and tetramethoxysilane dropwise, after standing; and then centrifugation, washing, drying, and calcination to obtain silica nanosphere with core-shell structure.

* * * * *